United States Patent [19]

Spencer

[11] 4,262,770

[45] Apr. 21, 1981

[54] POROUS ACOUSTIC ELEMENT AND A METHOD OF CONTROLLING AERODYNAMIC NOISE IN A FLOWING GAS

[75] Inventor: Andrew R. Spencer, Bloomfield Hills, Mich.

[73] Assignee: Facet Enterprises, Inc., Tulsa, Okla.

[21] Appl. No.: 945,261

[22] Filed: Sep. 22, 1978

Related U.S. Application Data

[63] Continuation of Ser. No. 781,601, Mar. 28, 1977, abandoned.

[51] Int. Cl.² ................... F01N 1/24; B65H 81/00
[52] U.S. Cl. .................... 181/258; 181/280; 181/296; 156/191; 156/195; 156/188; 210/510; 428/36; 428/686; 428/222; 428/592; 428/613; 428/615
[58] Field of Search ........... 428/36, 109, 137, 222, 428/613, 593, 596, 592, 615, 636, 686; 210/510; 29/163.5 R, 163.5 F, 423; 416/97 R; 156/188, 190, 191, 195; 181/279, 280, 256, 258, 296

[56] References Cited

U.S. PATENT DOCUMENTS

| | | | |
|---|---|---|---|
| 2,857,657 | 10/1958 | Wheeler, Sr. | 29/163.5 F |
| 3,067,982 | 12/1962 | Wheeler, Jr. | 416/97 A |
| 3,123,446 | 3/1964 | Wheeler, Jr. | 428/593 |
| 3,264,720 | 8/1966 | Mott | 428/613 |
| 3,266,130 | 8/1966 | Glaze | 29/163.5 R |
| 3,900,629 | 8/1975 | Spencer | 428/136 |

Primary Examiner—William R. Dixon, Jr.
Attorney, Agent, or Firm—Remy J. VanOphem

[57] ABSTRACT

A porous acoustic element is disclosed having a configuration comprised of individual cross-wound porous layers of widely varying porosity, with transition plenum layers interposed therebetween having a configuration so as to prevent formation of blockages and small area openings which would be created by a direct overlay winding of differing pitch. The porosity of each wound layer increases in successive layers to compensate for expansion of the gas as it flows through the element. The resulting porous element allows gaseous flow therethrough, with maximum pressure energy dissipation and controlled velocity to minimize aerodynamic noise created by flow through valves and other flow restrictions. A specific embodiment is disclosed in which the porous layers are created by variable pitch wire ribbon cross windings and the transition layers are provided by wire mesh having relatively large openings.

5 Claims, 7 Drawing Figures

POROUS ACOUSTIC ELEMENT AND A METHOD OF CONTROLLING AERODYNAMIC NOISE IN A FLOWING GAS

This is a continuation of application Ser. No. 781,601 filed Mar. 28, 1977, now abandoned.

FIELD OF THE INVENTION

This invention concerns control of aerodynamic noise created by gaseous flow through a flow restriction, and more particularly, tortuous path type elements designed to minimize such aerodynamic noise by gradually dissipating the pressure energy of the gas and limiting the velocity of the gas flow below that at which noise levels become troublesome.

BACKGROUND OF THE INVENTION

Control of noise created by gas flow through restrictions in piping systems has become increasingly important as noise levels in manufacturing and other industrial facilities have been subjected to close governmental regulation. In addition, in certain defense applications, i.e. submarines, noise control is a critical design objective. A major source of noise in such situations have been identified as being caused by an aerodynamic phenomenon associated with high velocity flow levels created by a rapid expansion of the gas after passing through a flow restriction, creating localized high velocity flow conditions.

In order to prevent such excessive velocities, tortuous flow path elements have been used in conjunction with valves, etc., to gradually decrease the pressure of the gas so that its velocity remains substantially constant and at a relatively low level. Such tortuous path devices have in the past been provided by relatively expensive machined parts or stacked discs in which labyrinth passages are formed.

While such devices may accomplish the desired control of gas velocities, the cost penalty is relatively high and the flexibility of design is limited in adapting to varying flow conditions which has led to the consideration of porous materials, but in most such materials it is difficult to accurately control pore size to prevent localized conditions of high velocity flow created by the occurrence of relatively small openings.

One such material in which relatively precise control over the pore size may be had is a precision wound material of the sort described in U.S. Pat. Nos. 2,857,657 and 3,123,446. This material is formed by a precision winding operation in which wire ribbon material is wound on a mandrel with successive windings being crossed with respect to each other to create porous layers having openings of precisely controlled size. The layers of windings are subsequently diffusion bonded to provide a unitary structure. This approach provides a material in which porosity may be relatively easily controlled by varying the pitch, the crossover angle of the windings, wire size, etc.

In the above described design, a slight taper in the opening size occurs as windings of the same pitch are wound on an increasingly greater diameter created by the previous layer, but such taper is not nearly great enough to compensate for the change in density of the gas. If the pitch of successive windings is increased to provide such increased area openings, periodic interference patterns between windings are created which form small area openings and blockages, causing localized high flow velocities, at least partially defeating the objectives described. In addition, minimum pore sizes must sometimes be held to prevent blockages by particles suspended in the gas.

Accordingly, it is an object of the present invention to provide a controlled porosity material which is formed by successive windings of wire and in which the winding pitch is varied in successive windings, while the interference patterns described are avoided to provide a porous acoustic element.

SUMMARY OF THE INVENTION

This and other objects of the present invention which will become apparent upon a reading of the following specification and claims are accomplished by forming a controlled porosity element by successively winding layers of increasing pitch but which layers are not directly wound on each other but rather on transition layers having openings therein acting as plenum spaces, such transition layers in the preferred embodiment being provided by a layer of mesh material having openings of an area on the order of the largest contiguous wound layer. The particular configuration of the transition layer, i.e., the difference in the angle of the mesh material and the size of the openings precludes formation of an interference pattern to allow the mesh layer openings to act as plenum spaces and provide a transition space for flow therethrough into the next wound layer.

DETAILED DESCRIPTION OF THE PREFERRED EMBODIMENT

In the following specification and drawings, a particular embodiment is described in accordance with the requirements of 35 U.S.C. 112 and specific terminology utilized for the sake of clarity, but it is to be understood that the same is not intended to be limiting and should not be so construed inasmuch as the invention may take many forms and variations within the scope of the appended claims.

Figure 1:
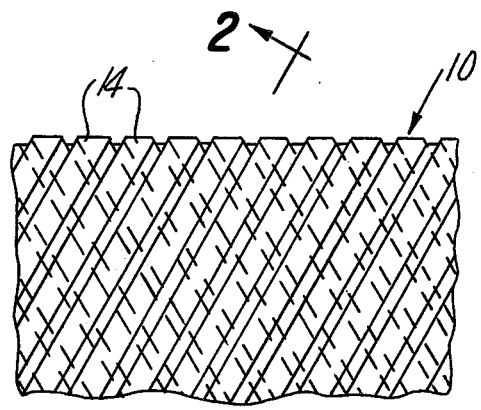
FIG. 1 is a fragmentary view of a section of a porous acoustic element according to the present invention.
Figure 2:
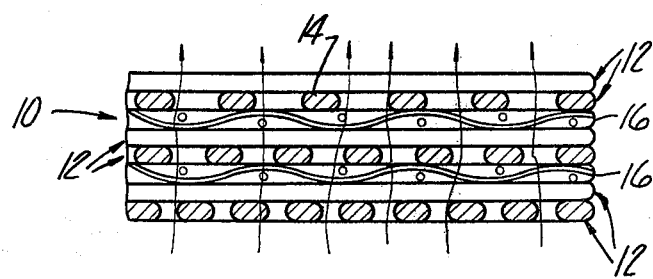
FIG. 2 is a view of the section 2—2 taken in FIG. 1.
Figure 3:
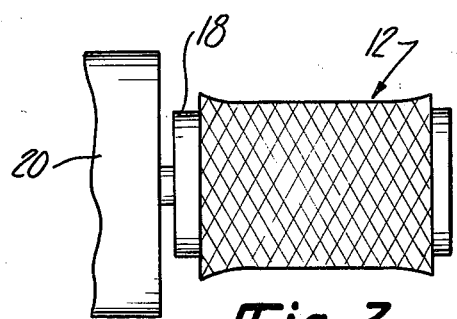
FIGS. 3–7 are diagrammatic representations of steps in the manufacture of the porous acoustic element according to the present invention.

Referring to the drawings and particularly FIGS. 1 and 2, the porous acoustic element 10 consists of a plurality of porous layers 12 each created by windings of flattened wires 14 of a construction as taught by U.S. Pat. No. 2,867,657. Successive windings of the ribbon wire 14 cross each other and are of constant spaced apart pitch so as to create a controlled porosity layer.

Interposed between the porous layers 12 are transition or plenum layers 16 in the preferred embodiment provided by layers of square weave mesh 16 placed over the first porous layer 12 with the square weave pattern extending transversely to the windings in the porous layers.

According to the concept of the present invention, each of the cross-winding layers 12 is of a progressively more open construction in the direction toward which flow is to occur, i.e., from the region of high pressure towards the region of relatively low pressure, as indicated in FIG. 2. The relationship between the openings of successive winding layers as well as the number of successive layers should be designed to correspond to the pressure gradient conditions existing in the particular application.

Each of the transition or plenum layers 16 have openings sized to be larger than either cross-winding layer 12 contiguous therewith, and of such a configuration that the overlay of the transition layer 16 and either contiguous cross-winding layer 12 does not create the interference pattern described above, thereby preventing the occurrence of undersized openings or blockages. This configuration is provided in this embodiment by the square weave pattern extending transversely to the wire windings. Thus, flow may occur from one cross-winding layer 12 through the transition layer 16 to a successive cross-winding layer of substantially different pitch without creating the overlay interference problem.

The entire assemblage is diffusion bonded to create a unitary or monolithic structure for incorporation into a valve housing or other application device.

A specific example, for illustrative purposes only, will be given in conjunction with a brief description of a typical fabrication process, depicted diagrammatically in FIG. 3-7.

In the first step, a first porous layer 12 was produced by winding on a mandrel 18 rotated in a winding machine 20, a 0.008 inch thick by 0.125 inch wide stainless steel ribbon, with a 9° helix angle and a 0.185 inch center-to-center spacing between winds and 0.060 distance between wires. This produces a porous layer having a 10.5% open area.

Next, a layer of wire mesh was calendered to reduce its thickness at wire cross-over points to improve contact area. This woven wire mesh was of 0.016 inch diameter stainless steel wire having 16 wires per inch to produce a spacing of 0.0465 with an open area greater than 50%.

Figure 4:
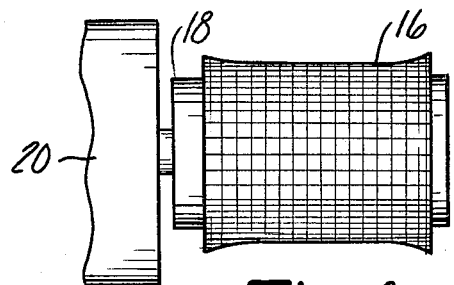

The layer of wire mesh 16 was placed over the existing cross-wound layer 12 as shown in FIG. 4 and held in place by some temporary fastener such as tape, etc., until the first few windings were made of the next cross-wound layer 12.

Figure 5:
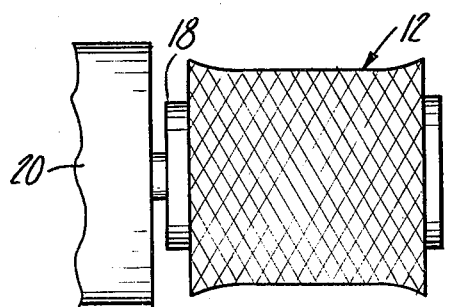

A second cross-wound layer 12 is wound over the transition layer 16 as shown in FIG. 5. This layer was of 0.010 inch thick stainless steel wire ribbon 0.063 inches wide, center-to-center spacing of 0.104 inches and a distance between wires of 0.041 inches and 9° helix angle, producing an open area of 15.5%.

Additional transition and cross-wound layers were added alternately as described to produce a desired porosity characteristic.

Figure 6:
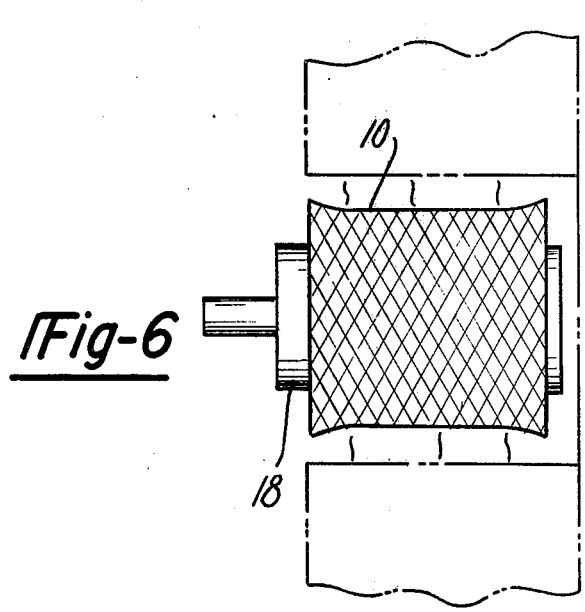
Figure 7:
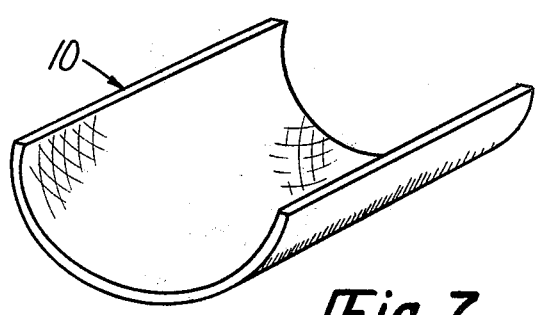

Next, the assemblage is sintered or diffusion bonded by heating in a vacuum or hydrogen atmosphere as depicted in FIG. 6 to bond the contacting intersections of the wires and produce unitary porous tube.

The layers of wound wires are then removed from the mandrel 18 for further fabrication steps, such as sectioning or forming sheets of the material, depending on the requirements of the particular application.

While a square-weave mesh material has been found to provide spaces which will act as plenums, and not create restrictions when overlaying the cross-wound layers, other materials could also be utilized to accomplish this same end. For example, photoetched or punched layers of thin metal and disclosed in U.S. Pat. No. 3,900,629 having appropriately sized parallel slots which could be utilized.

Another alternative would be to wind a single layer of flattened wire at a very low helix angle (i.e., 1° or less) at spacing equal or greater than the desired minimum pore size.

Accordingly, it can be seen that a relatively easily fabricated porous acoustic element which is readily adapted to almost any situation has been provided by the present invention, inasmuch as the number of layers and their characteristics may be varied to tailor the overall porosity of the material. This element is used to great advantage in the disclosed method of controlling aerodynamic noise.

What is claimed is:

1. A porous acoustic gas expansion control element comprising:
    a first porous layer comprised of a plurality of layers of windings of wire, each of said windings being spaced apart at the same pitch with successive layers being wound to cross each other to create a multiplicity of first spaces having a total ross-sectional area;
    a second porous layer comprised of a plurality of layers of windings of wire, each of said windings being spaced apart at the same pitch, said pitch being greater than the pitch of said first porous layer windings, with successive layers being wound to cross each other to create a multiplicity of second spaces, said multiplicity of second spaces having a total ross-sectional area larger than the total cross-sectional area of said multiplicity of first spaces;
    a transition layer interposed between said first and second porous layers, said transition layer being formed with a multiplicity of plenum openings, said multiplicity of openings having a cross-sectional area at least as great as the cross-sectional area of said multiplicity of second spaces, said transition layer being configured and oriented to allow gas expansion from said first porous layer to said second porous layers, whereby the interference pattern of the overlay of said transition layer with each of said first and second porous layers does not produce blockages or openings of smaller area than the spaces of either of said first or second porous layers; and
    said first and second porous layers and said transition layer being bonded together to form an integral structure.

2. The porous acoustic gas expansion control element according to claim 1 wherein said transition layer consists of square-weave mesh having a multiplicity of openings therein, said multiplicity of openings having a greater cross-sectional area than said cross-sectional area of said multiplicity of second spaces, said mesh weave disposed transversely to the direction of said windings in said first and second porous layers.

3. The porous acoustic gas expansion control element according to claim 1 further including one or more additional porous layers and interposed transition layers, each of said successive one or more porous layers being formed by a plurality of windings of wire of increasing spacing therebetween, and each of said one or more additional transition layers having a multiplicity of openings with a total cross-sectional area at least as great as the total cross-sectional area of the multiplicity of spaces in the porous layers adjacent thereto.

4. A method of reducing aerodynamic noise in a gas flowing from a region of relatively high pressure to a region of relatively lower pressure by limiting the gas flow velocity comprising:

disposing a first porous layer in juxtaposition to said high pressure region to cause said gas to flow through said first porous layer, said first porous layer being comprised of a plurality of layers of windings of wire, each of said windings being spaced apart at the same pitch with successive layers being wound to cross each other to create a multiplicity of first spaces, said first spaces having a total predetermined cross-sectional area;

disposing a transition layer adjacent said first porous layer remote from said high pressure region, said transition layer being formed with a multiplicity of plenum openings of total cross-sectional area at least as great as the total predetermined cross-sectional area of said multiplicity of first spaces in said first porous layer;

disposing a second porous layer, said second porous layer being comprised of a plurality of layers of windings of wire in juxtaposition to said transition layer, each of said windings being spaced apart at the same pitch, said pitch being greater than the pitch of said first porous layer windings, with successive layers being wound to cross each other to create a multiplicity of second spaces, said second spaces having a total predetermined cross-sectional area greater than said total predetermined cross-sectional area of said first spaces, such that the difference in total cross-sectional area corresponds to the increase in the volume of said gas as said pressure decreases in flowing through said first porous layer and said transition layer;

said transition layer further being oriented to said first porous layer so as to preclude an interference pattern producing blockages or openings of smaller area than either of said first or second porous layers;

bonding together said first and second porous layers and said transition layer; and then passing said gas through a sufficient number of alternating porous and transition layers from said high pressure region to said lower pressure region to decrease said gas pressure to that existing in said low pressure region without exceeding a predetermined gas flow velocity.

5. A method of manufacturing a porous acoustic element comprising:

winding a plurality of windings of wire on a mandrel at a constant spaced apart pitch, successive windings crossing each other to create a first porous layer; placing a transition plenum layer over said porous layer; winding a plurality of windings of wire on said mandrel over said transition layer at a constant spaced apart pitch differing from the pitch of said first porous layer windings, successive windings crossing each other to create a second porous layer;

bonding said windings in said first and second porous layers and said transition layer together to create a unitary structure.

* * * * *

UNITED STATES PATENT OFFICE
CERTIFICATE OF CORRECTION

Patent No. 4,262,770    Dated April 21, 1981

Inventor(s) Andrew R. Spencer

It is certified that error appears in the above-identified patent and that said Letters Patent are hereby corrected as shown below:

Column 1, line 59-60, after line 59 insert----While these features would seem to lend this construction to the above described tortuous path flow element, an additional requirement of such a flow element is that the openings should be progressively larger to compensate for expansion of the gas as the pressure declines in passing through the tortuous path----.

Column 2, line 53, delete "U.S. Patent No. 2,867,657" and insert----U.S. Patent No. 2,857,657----.

Column 4, line 27, dleter the word "ross-sectional" and insert----cross-sectional----.

Signed and Sealed this

First Day of September 1981

[SEAL]

Attest:

GERALD J. MOSSINGHOFF

Attesting Officer    Commissioner of Patents and Trademarks